US008135887B2

(12) United States Patent
Hamada et al.

(10) Patent No.: US 8,135,887 B2
(45) Date of Patent: Mar. 13, 2012

(54) RELAY, ENTERTAINMENT APPARATUS, COMMUNICATION SYSTEM, COMMUNICATION METHOD, AND PROGRAM

(75) Inventors: Koji Hamada, Tokyo (JP); Katsunori Gendou, Saitama (JP)

(73) Assignee: Sony Computer Entertainment Inc., Tokyo (JP)

( * ) Notice: Subject to any disclaimer, the term of this patent is extended or adjusted under 35 U.S.C. 154(b) by 20 days.

(21) Appl. No.: 10/583,308

(22) PCT Filed: Sep. 14, 2005

(86) PCT No.: PCT/JP2005/016895
§ 371 (c)(1),
(2), (4) Date: Apr. 13, 2007

(87) PCT Pub. No.: WO2006/030804
PCT Pub. Date: Mar. 23, 2006

(65) Prior Publication Data
US 2007/0188968 A1 Aug. 16, 2007

(30) Foreign Application Priority Data

Sep. 17, 2004 (JP) .................................. 2004-272642

(51) Int. Cl.
*G06F 13/12* (2006.01)
*G06F 13/38* (2006.01)
(52) U.S. Cl. ............................................. 710/62; 463/1
(58) Field of Classification Search .......................... None
See application file for complete search history.

(56) References Cited

U.S. PATENT DOCUMENTS

| 6,466,736 | B1* | 10/2002 | Chen et al. | 386/126 |
| 6,761,635 | B2* | 7/2004 | Hoshino et al. | 463/39 |
| 7,260,036 | B2* | 8/2007 | Tomisawa et al. | 369/47.24 |
| 2002/0054626 | A1 | 5/2002 | Inamura | |

FOREIGN PATENT DOCUMENTS

| JP | 6-96009 | 4/1994 |
| JP | 06-218142 A | 8/1994 |
| JP | 2001-314644 | 11/2001 |
| JP | 2001-314653 | 11/2001 |
| JP | 2001-327755 A | 11/2001 |
| JP | 2004-180182 | 6/2004 |
| WO | 99/59289 | 11/1999 |

(Continued)

OTHER PUBLICATIONS

"PlayStation 2" Sep. 13, 2004, Wikipedia pp. 1-3.*

(Continued)

*Primary Examiner* — Elias Mamo
(74) *Attorney, Agent, or Firm* — Katten Muchin Rosenman LLP

(57) ABSTRACT

A relay unit (70) is used to connect one or a plurality of manipulation terminals or external storage units to an entertainment apparatus. The entertainment apparatus (10) has a first mode and a second mode as operation modes. The relay unit includes a first relay processing unit (200-1) for the first mode, a second relay processing unit (200-2) for the second mode, and a control signal generator (201) configured to generate a control signal based on a selection signal externally entered. The relay unit (70) carries out relay processing for the first mode when the entertainment apparatus (10) is operating in the first mode, and carries out relay processing for the second mode when the entertainment apparatus (10) is operating in the second mode.

14 Claims, 14 Drawing Sheets

FOREIGN PATENT DOCUMENTS

| | | |
|---|---|---|
| WO | WO 99/59289 | 11/1999 |
| WO | WO 01/66209 A1 | 9/2001 |

OTHER PUBLICATIONS

Korean Notice of Preliminary Rejection dated Sep. 19, 2007, from the corresponding Korean Application.

Notification of Reason(s) for Refusal dated Jul. 9, 2010, from the corresponding Japanese Application.

USB2.0 vs IEEE1394 High-speed top confrontation, ASCII The Tenth vol. 26, Japan, ASCII Corporation, Oct. 1, 2002, p. 169-171.

USB 2.0, DOS/V Power Report, Jan. 1, 2001, pp. 381-388.

Supplementary European Search Report dated Dec. 30, 2010, from corresponding European Application No. EP 05 78 3405.

* cited by examiner

RELAY, ENTERTAINMENT APPARATUS, COMMUNICATION SYSTEM, COMMUNICATION METHOD, AND PROGRAM

This application is a National Phase Application of International Application No. PCT/JP2005/016895, filed Sep. 14, 2005, which claims the benefit under 35 U.S.C. 119 (a-e) of Japanese Application No. 2004-272642 filed Sep. 17, 2004, which is herein incorporated by reference.

TECHNICAL FIELD

The present invention relates to an entertainment apparatus 120 for executing a game program or the like, a relay unit for connecting one or more manipulation terminals or external storage units to the entertainment apparatus, a communication system, a communication method, and a program for operating a computer as the entertainment apparatus.

BACKGROUND ART

An electronic device such as an entertainment apparatus for domestic use is connected to an manipulation terminal such as a controller and an external storage unit such as a memory card stored with various data regarding the operating environment of the manipulation terminal and status of a game executed by the entertainment apparatus.

An entertainment apparatus connected to a relay unit, to which multiple manipulation terminals and external storage units are simultaneously connectable, instead of directly connected to an manipulation terminal and an external storage unit so that multiple players may play a game is well known. For example, four manipulation terminals and external storage units may be connected thereto. There is a merit of diversified pastime for multiple persons enjoying a game using the entertainment apparatus since use of such relay unit allows connection of multiple manipulation terminals to a single relay unit. This kind of relay unit is called a 'multitap'.

Meanwhile, advancement of semiconductor technologies and the like has brought about development and distribution of higher performance entertainment apparatus. With such new line of entertainment apparatus, a user having purchased a new model cannot use old model game software with the new model if the new model and the old model are incompatible. An entertainment apparatus accommodating both new and old software is provided to eliminate this inconvenience. Such entertainment apparatus has a first mode and a second mode as operation modes, and switches the operation mode according to type or the like of storage medium. The first mode is a normal mode for carrying out normal operation (operation as a new model, for example) of the entertainment apparatus, and the second mode is a compatible mode for different operation from normal operation (operation as an old model, for example), assumed compatibility with other models. Since mode switching is automatically performed with the entertainment apparatus accommodating both new and old software, game players may enjoy a desired game only by loading a game medium such as a CD or DVD (e.g., Patent Document 1).

[Patent Document 1] Japanese Patent Application Laid-open 2001-314644

PROBLEM TO BE SOLVED BY THE INVENTION

However, when trying to enjoy a game using the entertainment apparatus accommodating both old and new software in the case of using a relay unit, the relay unit needs to be replaced, the replaced relay unit and the entertainment apparatus need to be reconnected, and reconnection of manipulation terminals and external storage units to the relay unit is necessary. In other words, since the conventional relay units do not have multiple operation modes, the entertainment apparatus needs to be connected to a dedicated relay unit when operating in the first mode while it similarly needs to be connected to a dedicated relay unit when operating in the second mode.

Even if the entertainment apparatus itself can automatically select new or old operation mode, detaching the relay unit and the manipulation terminals and the external storage units connected thereto is performed manually, which is extremely troublesome. Thus full use of the automatic selection function for an operation mode of the entertainment apparatus is impossible and imposes a burden on the game players, possibly leading to a reduction of interest in the game.

DISCLOSURE OF INVENTION

The present invention is developed to resolve these problems, and aims to provide a relay unit that allows automatic selection of an operation mode according to switching of operation modes of an entertainment apparatus, a communication system, a communication method, an entertainment apparatus suitable for the relay unit, and programs for them.

MEANS OF SOLVING THE PROBLEM

According to an aspect of the present invention, a relay unit, which connects one or a plurality of manipulation terminals or external storage units to an entertainment apparatus having a first mode and a second mode as operation modes, is characterized in that it carries out relay processing for the first mode when the entertainment apparatus is operating in the first mode while carrying out relay processing for the second mode when the entertainment apparatus is operating in the second mode.

In at least either the case of changing from the first mode to the second mode or changing from the second mode to the first mode, a period in which neither a first relay processing unit nor a second relay processing unit is selected for mode switching is preferably provided. The duration of the period in which neither the first relay processing unit nor the second relay processing unit is selected may be defined according to a communication protocol with the entertainment apparatus.

The first mode may be a normal mode for carrying out normal operation while the second mode may be a compatible mode for different operation from normal operation, assumed compatibility with other models.

According to an aspect of the present invention, a communication method, which is for connecting one or a plurality of manipulation terminals or external storage units to an entertainment apparatus having a first mode and a second mode as operation modes via a relay unit, is characterized in that it includes the steps of: reading information from a recording medium, and determining an operation mode of the entertainment apparatus based on the read information; relaying for the first mode when the entertainment apparatus is operating in the first mode based on the determination results of the step of determining; and relaying for the second mode when the entertainment apparatus is operating in the second mode based on the determination results of the step of determining.

Further according to an aspect of the present invention, an entertainment apparatus is characterized in that it has a first mode and a second mode as operation modes, reads information from a recording medium, determines operation mode based on the read information, generates an operation mode selection signal in accordance with the determined operation mode, and outputs the generated selection signal to the outside.

Further according to an aspect of the present invention, a program for operating a computer as an entertainment apparatus having a first mode and a second mode as operation modes includes: reading information from a recording medium, determining operation mode based on the read information, generating an operation mode selection signal in accordance with the determined operation mode, and outputting the generated selection signal to the outside.

The program according to the present invention is stored in a recording medium, for example.

The recording medium is such as an EPROM device, a flash memory device, a flexible disk, a hard disk, a magnetic tape, a magneto-optical disk, a CD (such as ROM and Video-CD), a DVD (such as DVD-Video, DVD-ROM, and DVD-RAM), a ROM cartridge, a RAM memory cartridge with battery backup, a flash memory cartridge, a nonvolatile RAM cartridge, or the like.

The recording medium may be recorded with information (mainly digital data and programs) using a physical means, and may be recorded with information allowing a processing unit such as a computer or a dedicated processor to carry out a predetermined operation.

BEST MODE FOR CARRYING OUT THE INVENTION

An embodiment according to the present invention is described with reference to the accompanying drawings.

Figure 1:
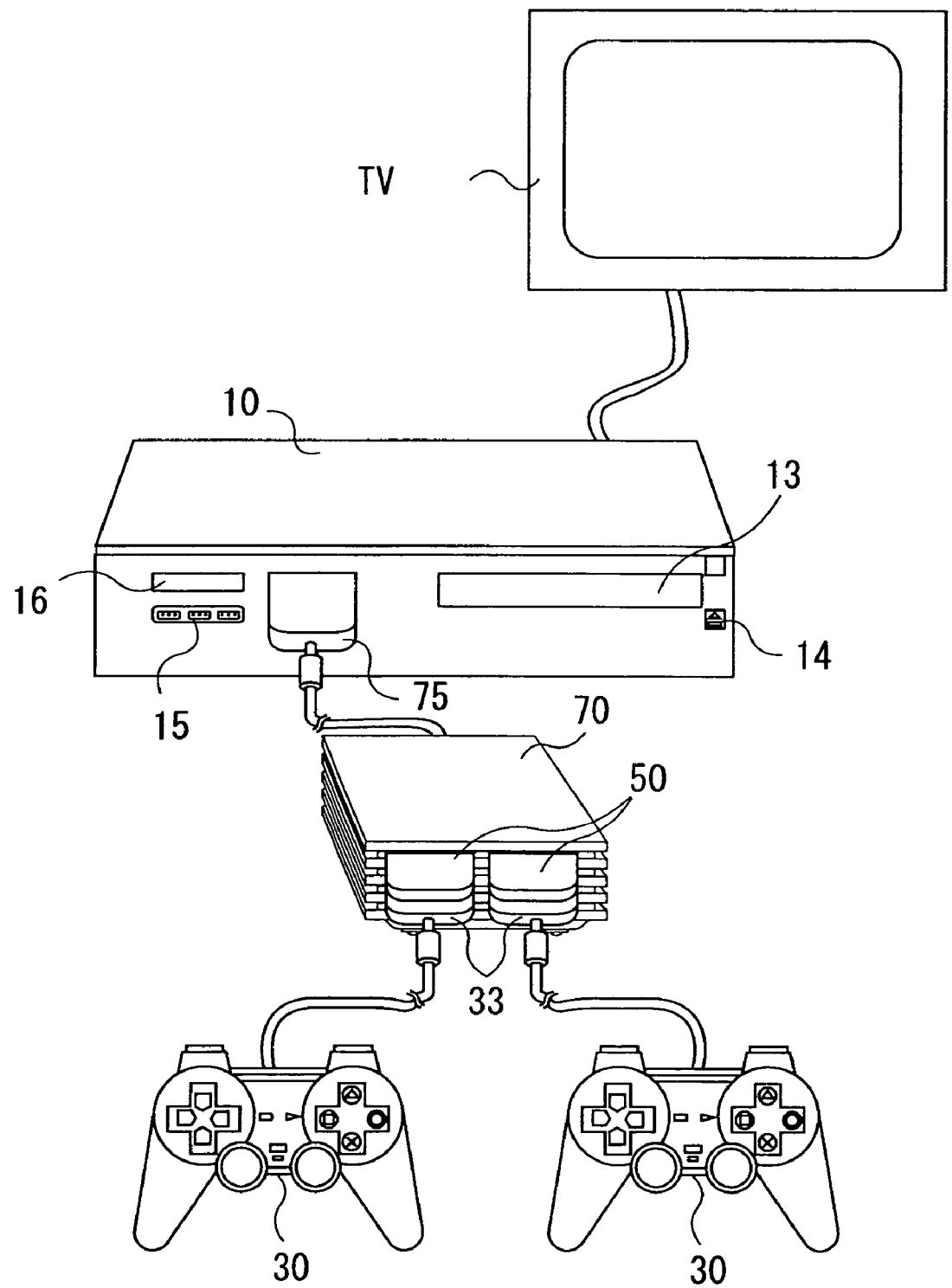
FIG. 1 is a general view of a system including an entertainment apparatus according to an embodiment of the present invention.

FIG. 1 shows a system including an entertainment apparatus according to an embodiment of the present invention.

This entertainment system includes an entertainment apparatus 10, which is a central processor, controllers 30 or manipulation terminals thereof, memory cards 50 or external storage units thereof, a relay unit 70 relaying among the entertainment apparatus 10, the controllers 30, and the memory cards 50, and an image/audio output device (typically a television receiver) TV connected to the entertainment apparatus 10.

A controller connector 15 and a memory card slot 16 are provided on the front side of the entertainment apparatus 10.

The entertainment apparatus 10 has a function of reading out an application program such as a game or an image from a storage medium such as an optical disk like a CD or a DVD and displaying it on the image/audio output device TV, and executing programs in conformity with instructions given by operators using the controllers 30. This entertainment apparatus 10 includes a main board, a power supply unit, a disk drive unit, and an input/output signal control substrate not shown in the drawing, which are all stored inside the chassis of the entertainment apparatus 10.

A disk unit not shown in the drawing plays back an optical disk such as a CD-ROM or a DVD-ROM, and includes a main body, which includes an optical pickup unit located inside the chassis of the entertainment apparatus 10, and a disk tray 13 configured to load the optical disk into the unit main body; wherein the end of the disk tray 13 is exposed at the front right side of the chassis. When a switch 14 adjacent to the disk tray 13 is operated, the disk tray 13 emerges from inside the chassis of the entertainment apparatus 10, allowing loading of the optical disk.

The controllers 30 or manipulation terminals output operational signals to the entertainment apparatus 10, and respectively include a connector 33 configured to connect to the relay unit 70 or the entertainment apparatus 10. For example, in the case where such controllers 30 are connected to the entertainment apparatus 10 via the relay unit 70 to execute an application program such as a game, operators (game players) may manipulate operating switches of the controllers 30 to output control signals, input the signals to the entertainment apparatus 10 via the relay unit 70, and execute the application program in a state desired by the operators.

The memory cards 50 serving as external storage units each include flash memory mounted on a substrate, and a case housing the substrate including the flash memory; where a conductive pattern is formed on the substrate end. Settings, progress statuses or the like of application programs such as games can be recorded in the memory cards 50, and when the game is over, a signal is output from the entertainment apparatus 10 to the memory cards 50 so as to store that status. On the other hand, when resuming execution of a temporarily ended game at a later date, recorded data in the memory cards 50 is loaded into the entertainment apparatus 10.

Figure 2:
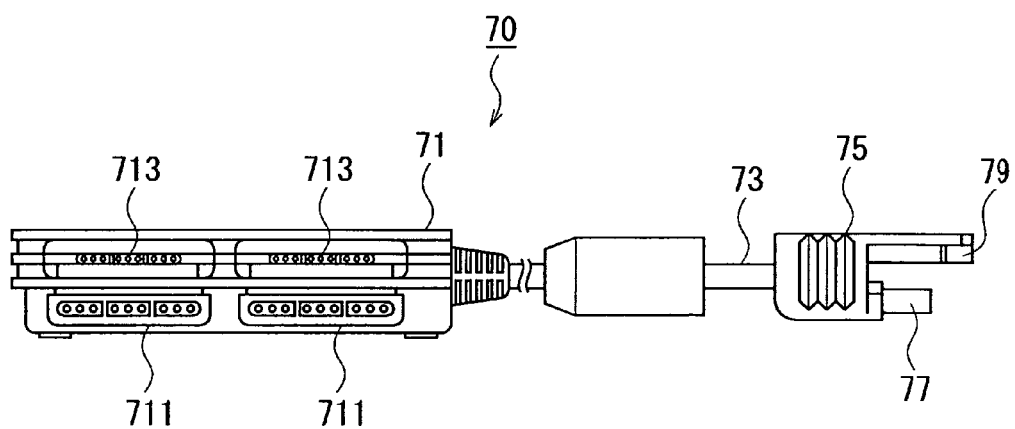
FIG. 2 is a side view of a relay unit according to the embodiment of the present invention.
Figure 3:
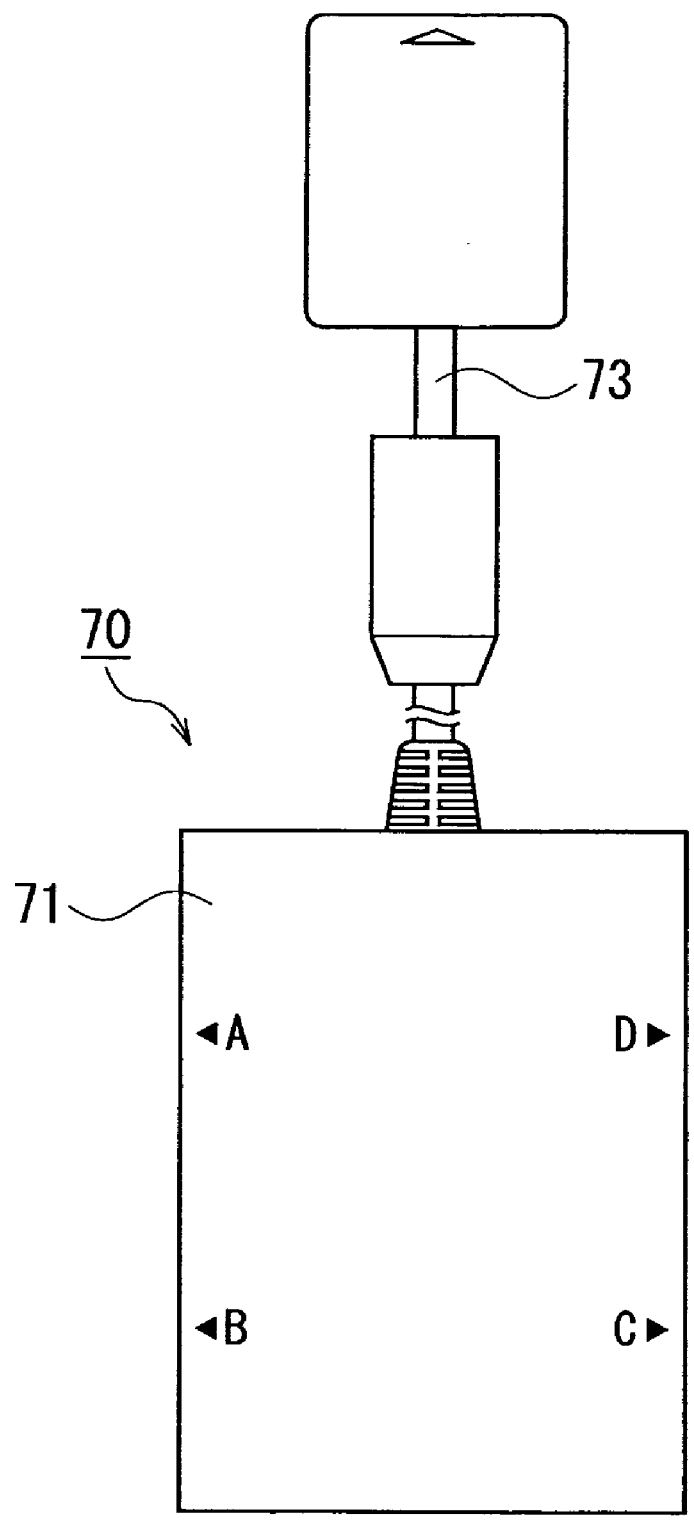
FIG. 3 is a top view of the relay unit according to the embodiment of the present invention.

FIG. 2 shows the right side of the relay unit 70 while FIG. 3 shows the top side thereof. The relay unit 70 includes a relay unit main body 71, a cable 73, and a main body connector 75. The main body connector 75 includes a controller connector 77 and a memory card connector 79. The relay unit main body 71 includes four controller connectors 711, four card slots 713, a control substrate not shown in the drawing, and a chassis housing them. Note that each of the controller connectors 711 has the same configuration as the controller connector 15 of the entertainment apparatus 10, and each of the card slots 713 has the same configuration as the card slot 16 of the entertainment apparatus 10.

The connectors 33 of the controllers 30 are connected to the respective controller connectors 711 or manipulation terminal connectors. The card slots 713 or external storage unit connectors are provided above the controller connectors 711 in accordance with the positions of the controller connectors 711, and memory cards 50 are inserted and connected thereto.

Figure 4:
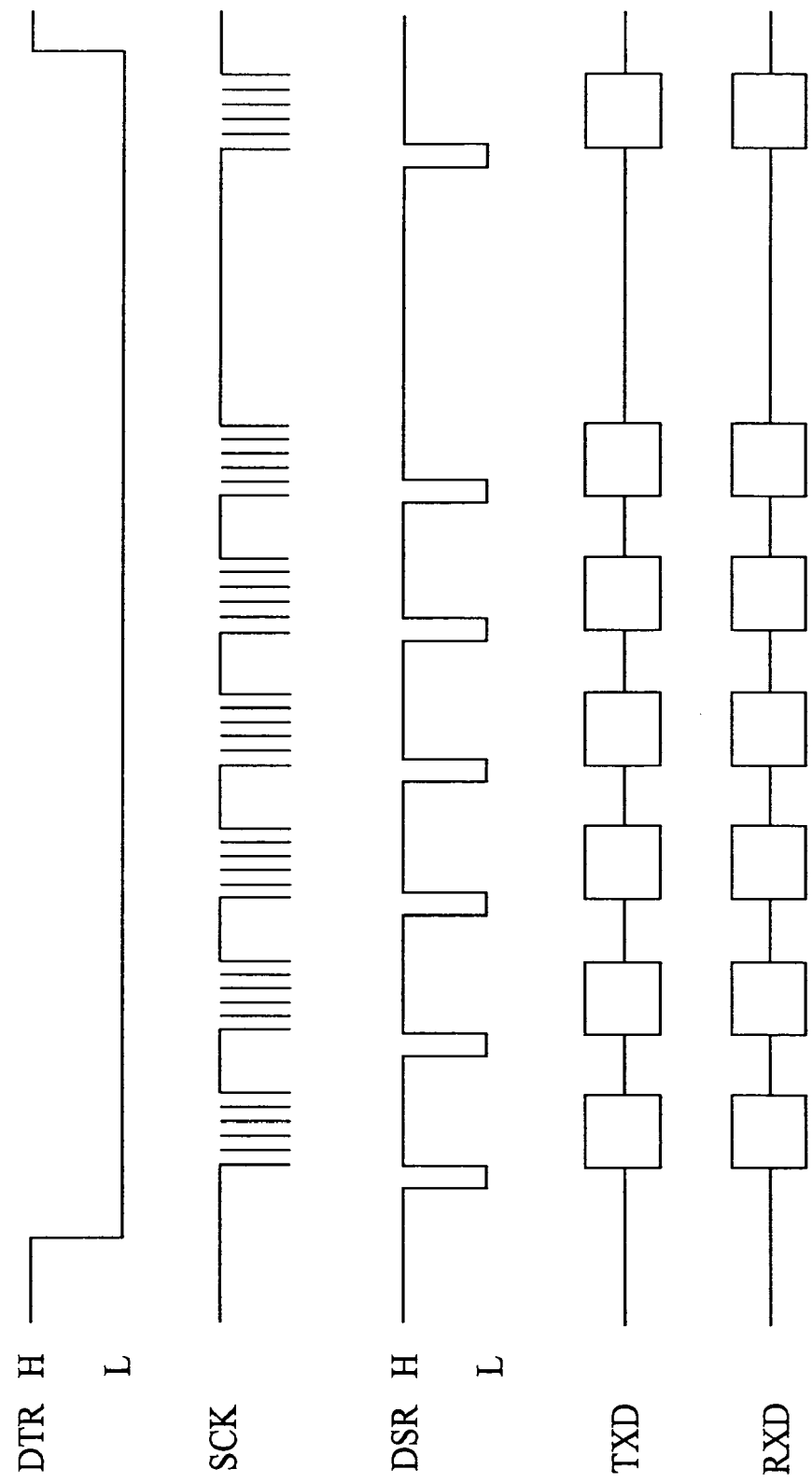
FIG. 4 is a timing chart for data communication between the entertainment apparatus and the relay unit according to the embodiment of the present invention.

As shown in the timing chart of FIG. 4, communication between the entertainment apparatus 10 and the relay unit 70 starts when a communication start notification signal DTR is Low, where the communication start notification signal DTR is always Low during communication. Note that when the communication start notification signal DTR becomes High, a communication controller of the relay unit 70 cancels communication in progress and then prepares for the next communication.

Transmission data TXD includes a protocol, which includes an identifying code for identifying a control target and a command to control said control target, and is output byte by byte from the entertainment apparatus 10 in synchronization with a serial clock SCK. Response data RXD includes an identifying code representing the control target processed based on the transmission data TXD and result information representing results of control of said control target, and is output byte by byte from the relay unit 70 in synchronization with the serial clock SCK.

A communication start acceptance signal DSR is a signal telling the entertainment apparatus 10 whether or not the next single byte signal is ready to be transmitted or received when transmitting or receiving each byte of the transmission data TXD or the response data RXD, and as can be known from FIG. 4, when preparation for transmission/reception by the relay unit 70 is complete, the communication start acceptance signal DSR is output as Low from the relay unit 70.

Note that since mode switching during communication of the transmission data TXD and the response data RXD may be regarded as occurrence of an erroneous communication by the entertainment apparatus 10, bringing about a malfunction or error, no mode switching during communication or ensuring that a failure does not occur even if the mode is switched is preferable. This is described in further detail later.

Commands included in a control signal output from the entertainment apparatus 10 to the relay unit 70 include a command for acquisition of the number of the controller connectors 711 of the relay unit 70 and number of the card slots 713 of the same.

Next, operations according to this embodiment of the present invention are described with reference to the block diagram of FIG. 5, the flowcharts of FIGS. 6 through 8, and the timing charts of FIGS. 9 and 10.

Figure 5:
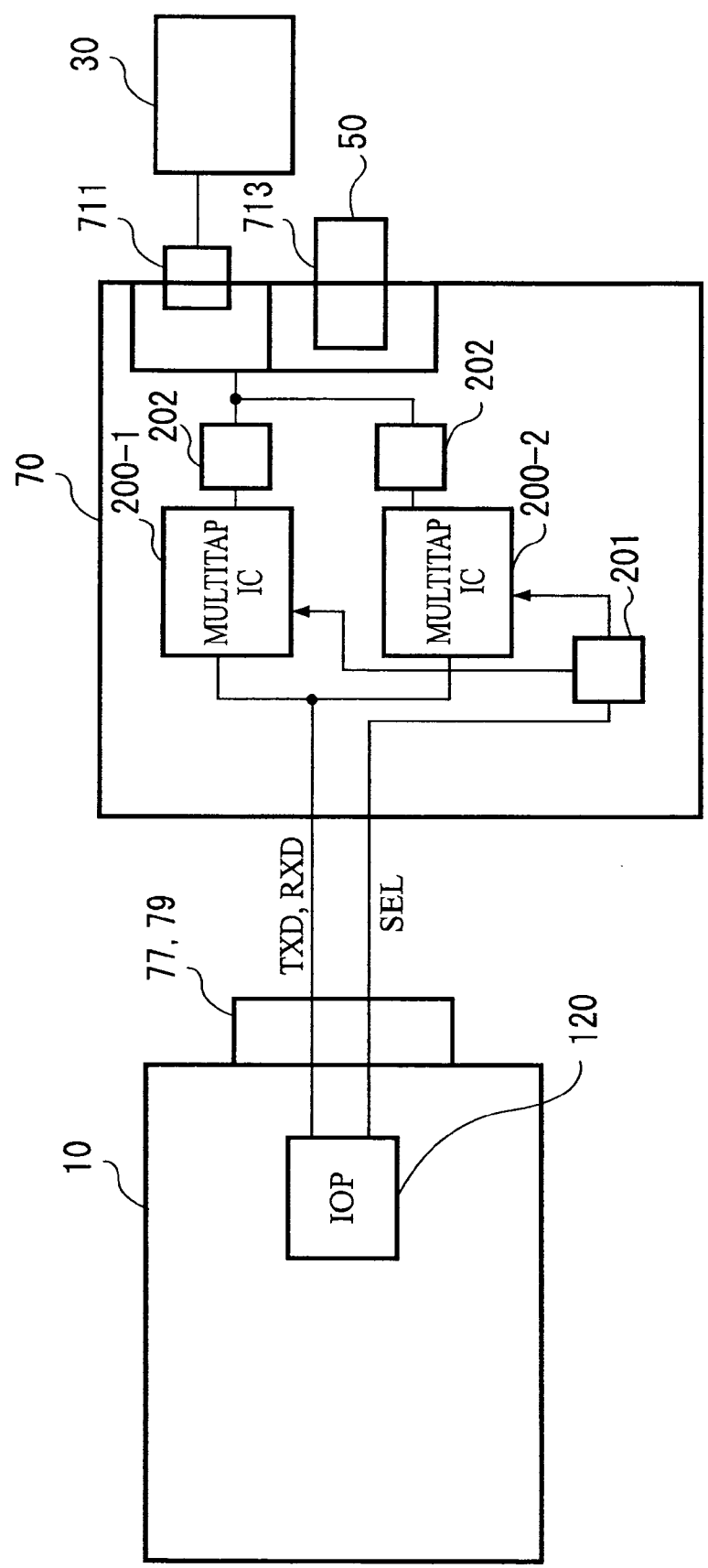
FIG. 5 is a functional block diagram of the entire system including the entertainment apparatus according to the embodiment of the present invention.

FIG. 5 is a functional block diagram of the entire system. The IOP 120 controlling input/output of the entertainment apparatus 10 is connected to a multitap IC 200-1 for first mode and a multitap IC 200-2 for second mode of the relay unit 70 via a signal line for transmitting the transmission data TXD and a signal line for receiving the response data RXD, and a selection signal SEL for mode switching output from the IOP 120 is input to a control signal generator 201 of the relay unit 70. This selection signal SEL is output from a predetermined terminal within the card slot 16 of the entertainment apparatus 10 shown in FIG. 1, and is input to the relay unit main body 71 via the memory card connector 79 and the cable 73 shown in FIG. 2. Note that within the cable 73, aside from a signal line for transmitting the selection signal SEL, the signal line for transmitting the transmission data TXD and the signal line for receiving the response data RXD are also accommodated. The multitap IC 200-1 and the multitap IC 200-2 are connected to the controller connectors 711 and the memory card connectors 713 via a bus buffer 202. The control signal generator 201 selects either the multitap IC 200-1 or 200-2 according to the selection signal SEL and then operates it. This switches the operation mode of the relay unit 70 to either a first mode or a second mode according to the selection signal SEL. Note that although FIG. 5 only shows one of the connectors 711 and one of the connectors 713 for simplicity, the relay unit 70 of this embodiment includes a plurality (four, for example) of the respective connectors. The IOP 120, the multitaps IC 200, the control signal generator 201, and the like are described in further detail later.

Figure 6:
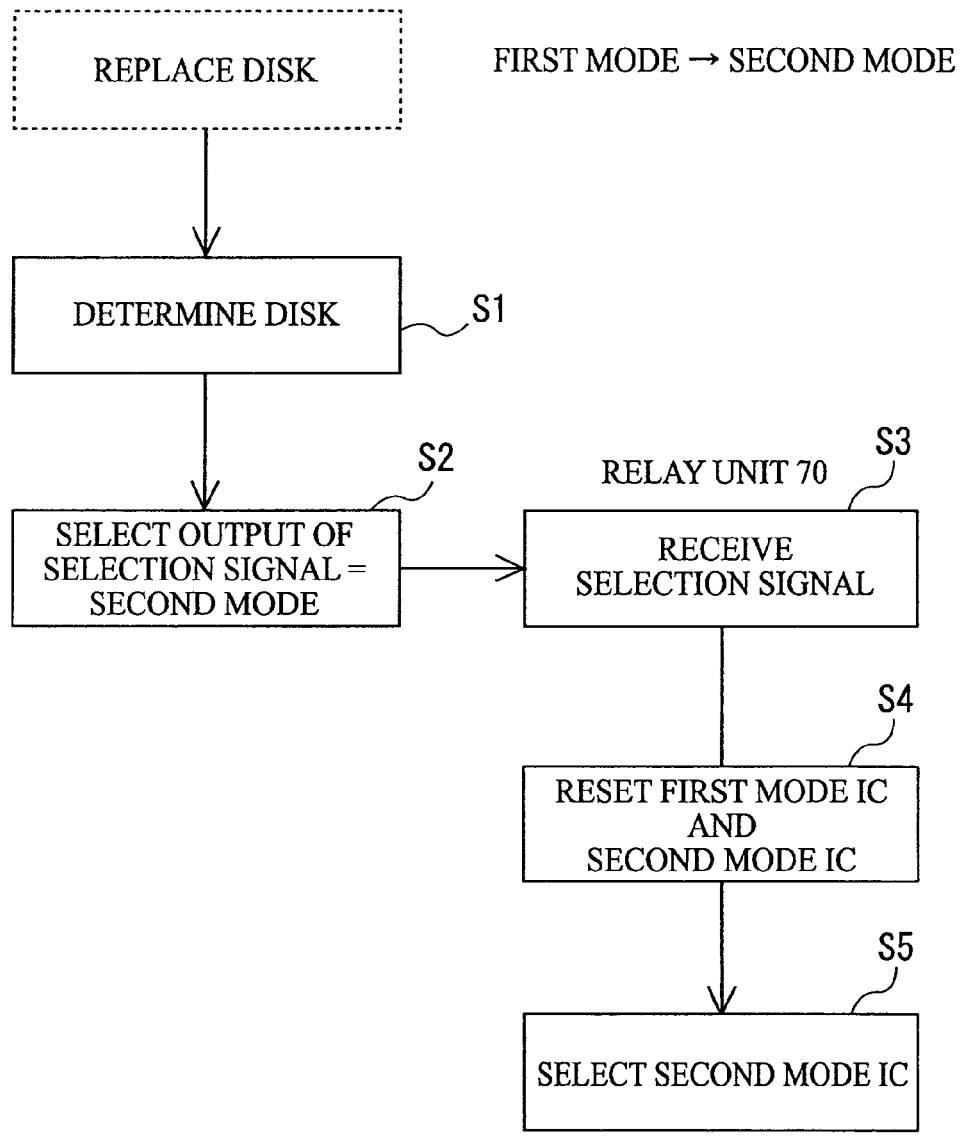
FIG. 6 is a flowchart showing an operation mode changing procedure for the relay unit according to the embodiment of the present invention.

FIG. 6 is a flowchart showing an example of operation mode switching. This diagram shows a case of switching from the first mode to the second mode when the disk is changed from a DVD to a CD. When the disk is replaced, the entertainment apparatus 10 reads and determines the disk (S1). As a result of the determination, since it is a CD, the operation mode of the entertainment apparatus 10 is switched to the second mode, and the selection signal SEL output is set so as to select the second mode (S2). The selection signal SEL is output and then received by the relay unit 70 (S3). When the relay unit 70 detects switching of the selection signal SEL, the relay unit 70 resets both the multitaps IC 200-1 and 200-2 (S4), and then selects the second mode multitap IC 200-2 (S5).

When switching the operation mode, it is preferable to make both the multitaps IC 200-1 and 200-2 enter a non-operational state as in step S4 and then make one of them operational state. There is fear that outputs of the multitaps IC 200-1 and 200-2 interfere in the operation of the entertainment apparatus 10 if both are not in a non-operational state as in step S4, and the entertainment apparatus 10 may thus malfunction. In the case of replacing the relay unit according to the operation mode of the entertainment apparatus 10, a task of manually switching connectors always needs to be performed, which ensures a period in a non-operational state, avoiding interference of outputs. In contrast, with the relay unit 70 according to this embodiment, the operating state of the relay unit at the time of switching the operation mode of the entertainment apparatus 10 is electronically switched, and thus processing of step S4 is effective.

Figure 7:
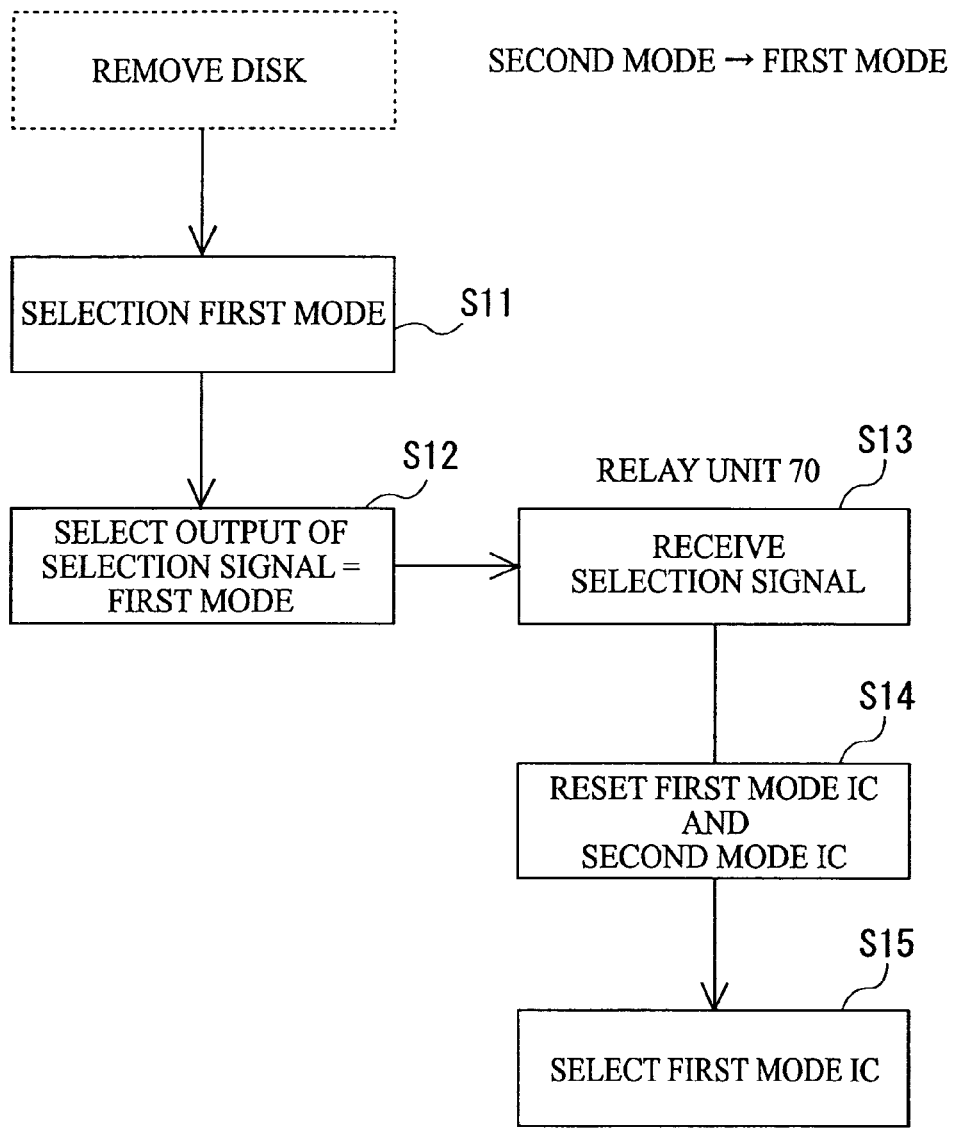
FIG. 7 is a flowchart showing another operation mode changing procedure for the relay unit according to the embodiment of the present invention.

FIG. 7 is a flowchart showing another example of operation mode switching. This diagram shows a case of switching from the second mode to the first mode when the CD is removed. Since the default is the first mode, the mode automatically returns to the first mode when a CD is not loaded into a disk drive (S11). The operation mode of the entertainment apparatus 10 is switched to the first mode, and the selection signal SEL output is set so as to select the first mode (S12). The selection signal SEL is output and then received by the relay unit (S13). When the relay unit 70 detects switching of the selection signal SEL, the relay unit 70 resets both the multitaps IC 200-1 and 200-2 (S14), and then selects the first mode multitap IC 200-1 (S15).

Figure 8:
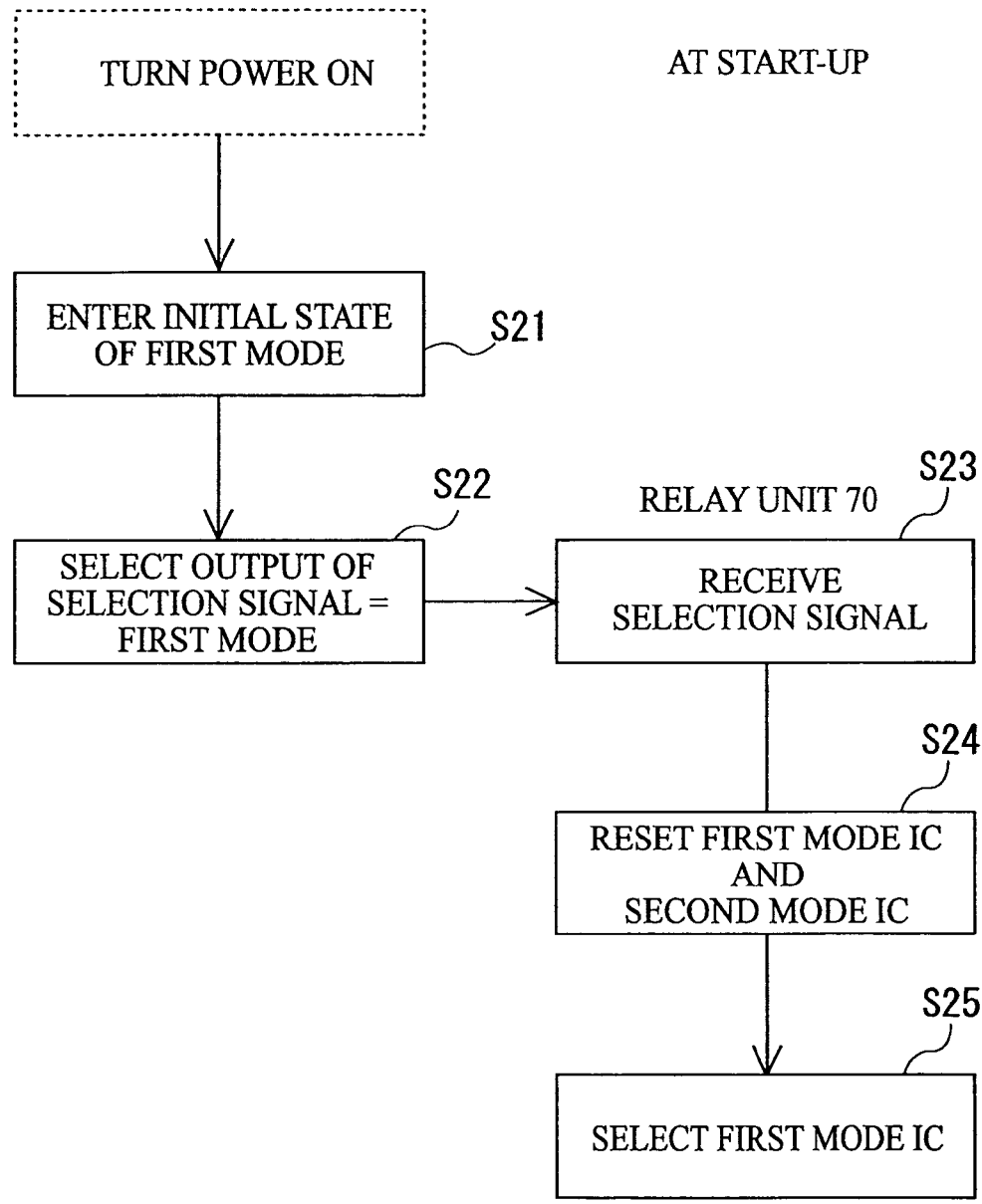
FIG. 8 is a flowchart showing another operation mode changing procedure for the relay unit according to the embodiment of the present invention.

FIG. 8 is a flowchart showing another example of operation mode switching. This diagram shows a case of setting to the first mode at start up upon resetting or application of power. Since the default is the first mode, the mode is automatically set to the first mode at start-up (S21). The operation mode of the entertainment apparatus 10 is set to the first mode, and the selection signal SEL output is set so as to select the first mode (S22). The selection signal SEL is output and then received by the relay unit 70 (S23). When the relay unit 70 detects application of power and resetting, the relay unit 70 resets both the multitaps IC 200-1 and 200-2 (S24), and then selects the first mode multitap IC 200-1 (S25). The power is supplied to the relay unit 70 from the entertainment apparatus 10, and therefore the relay unit 70 is made to be reset upon application of power or resetting.

Figure 9:
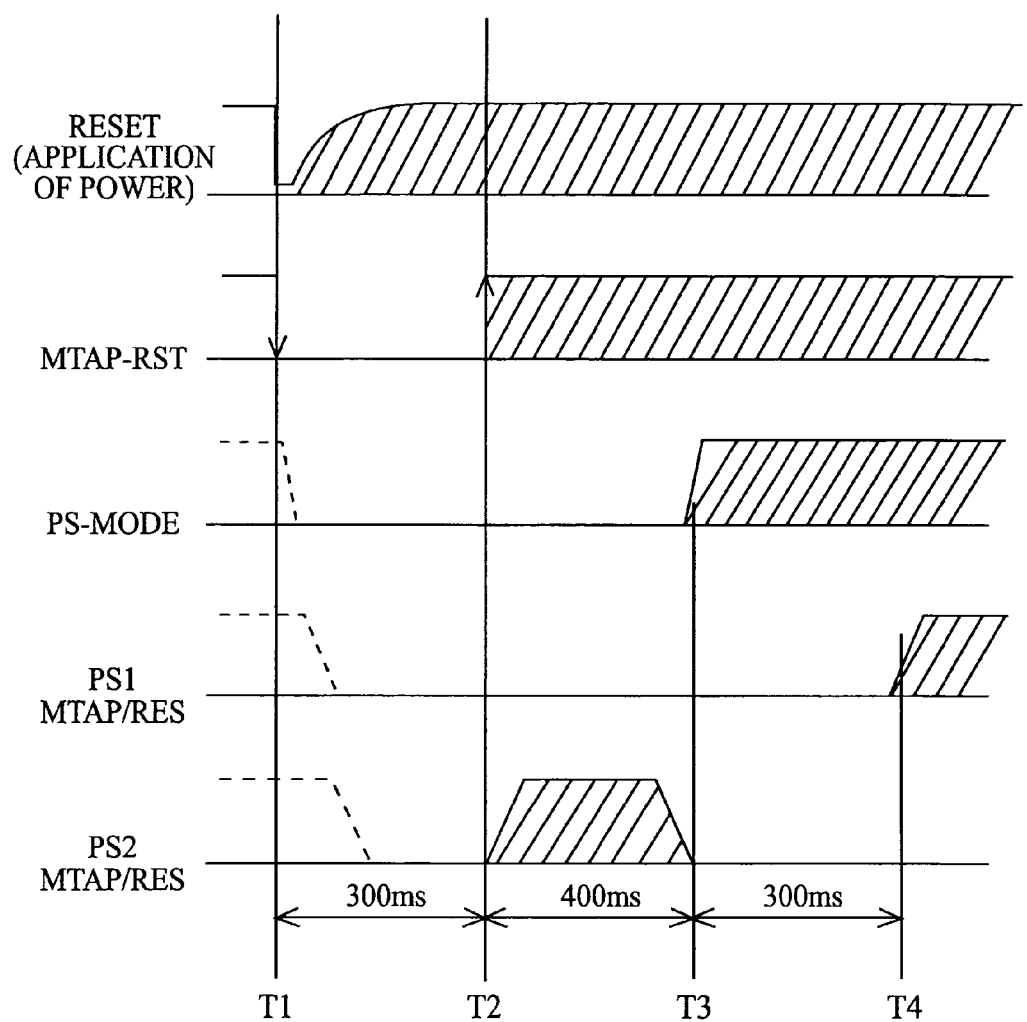
FIG. 9 is a timing chart showing an operation mode changing procedure for the relay unit according to the embodiment of the present invention.

FIG. 9 shows a timing chart for when a CD is loaded and a second mode application is executed. Since the power is applied or resetting is conducted when executing a new application, as shown by 'reset (application of power)' in FIG. 9, the voltage level of the power instantaneously drops to nearly zero at a time T1, and gradually returns to a normal level thereafter (time T1 is the time when resetting.) A reset signal MTAP-RST of a low level is generated between the time T1 and a time T2 by a reset IC built in the control signal generator 201. Upon application of power or resetting, determination of the entertainment apparatus 10 mode is carried out, and a selection signal SEL is output in conformity with results thereof. Since the first mode is selected as the default, the level begins at a low level and becomes a high level after determination is completed. In FIG. 9, a signal indicated by 'PS-mode' (corresponding to the selection signal SEL) is at a high level at a time T3, which means selection of the second mode. While the entertainment apparatus 10 operates in the second mode after the time T3, the multitaps IC 200-1 and 200-2 of the relay unit 70 both once enter a non-operational state between the times T3 and T4. This is to avoid output interference. In FIG. 9, both PSI MTAP/RES (corresponding to a selection signal for the multitap IC 200-2) and PS2 MTAP/RES (corresponding to a selection signal for the multitap IC 200-1) are at a low level between the times T3 and T4. The PSI MTAP/RES is at a high level after the time T4, where the multitap IC 200-2 is selected and the relay unit 70 operates in the second mode. When it is detected that the entertainment apparatus 10 is operating in the second mode and the relay unit 70 is also operating in the second mode at the time T4, normal operation continues.

Figure 10:
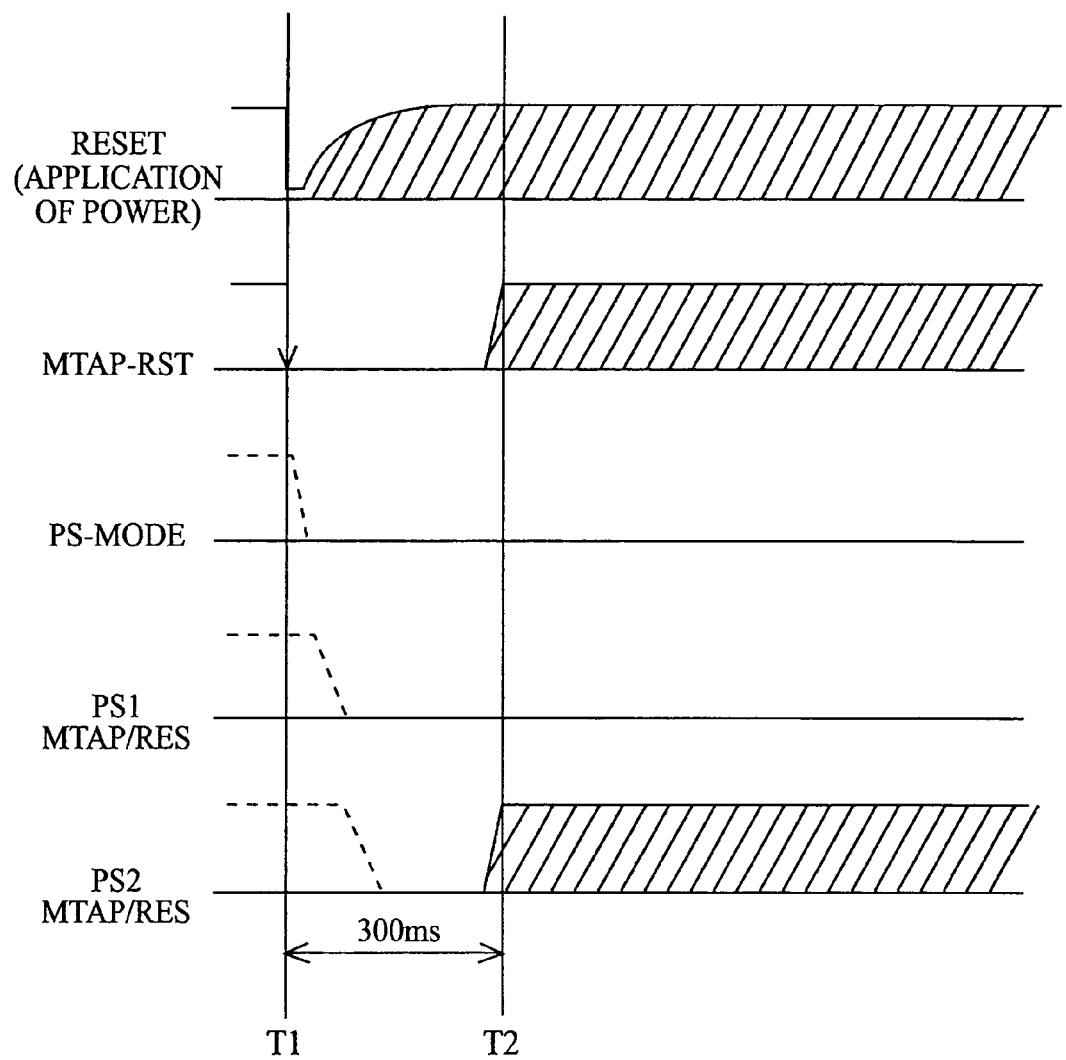
FIG. 10 is a timing chart showing another operation mode changing procedure for the relay unit according to the embodiment of the present invention.

FIG. 10 shows a timing chart for when a first mode application is executed. Since it is in the default state, the multitap IC 200-1 is selected after the time T2 and the relay unit 70 then operates in the first mode. Since both the PSI MTAP/RES and PS2 MTAP/RES are at a low level between the times T1 and T2, output interference does not occur at the time T2.

In both FIGS. 9 and 10, within a specified time period (300 ms) from when the operation mode has changed (the time T1 when the PS-mode changes from the high level to the low level in FIGS. 9 and 10, and the time T3 when it changes from the low level to the high level in FIG. 9), both the PSI MTAP/RES and the PS2 MTAP/RES are at a low level. While this is for avoiding signal interference as described above, both of the signals are preferably set to a low level at least during a data communication period (TXD and RXD duration) of FIG. 4 so that the entertainment apparatus 10 does not malfunction.

According to this embodiment of the present invention, a first mode IC and a second mode IC are included in the relay unit, and these are automatically selected according to switching of the operation mode of the entertainment apparatus, allowing provision of a relay unit (multitap) accommodating any kind of operation mode. Use of the relay unit according to this embodiment of the present invention makes it unnecessary to perform complicated tasks such as replacing the relay unit, reconnecting controllers, and detaching memory cards when changing mode.

Furthermore, controlling both the first mode IC and the second mode IC not to operate for a specified duration or longer right after operation mode switching allows avoidance of trouble occurred due to output signal confliction.

Next, configurations of the entertainment apparatus 10 and the relay unit 70 are described.

(1) Description of Entertainment Apparatus 10: Operation Mode Switching

The inner structure of the entertainment apparatus 10 is described in detail forthwith.

Figure 11:
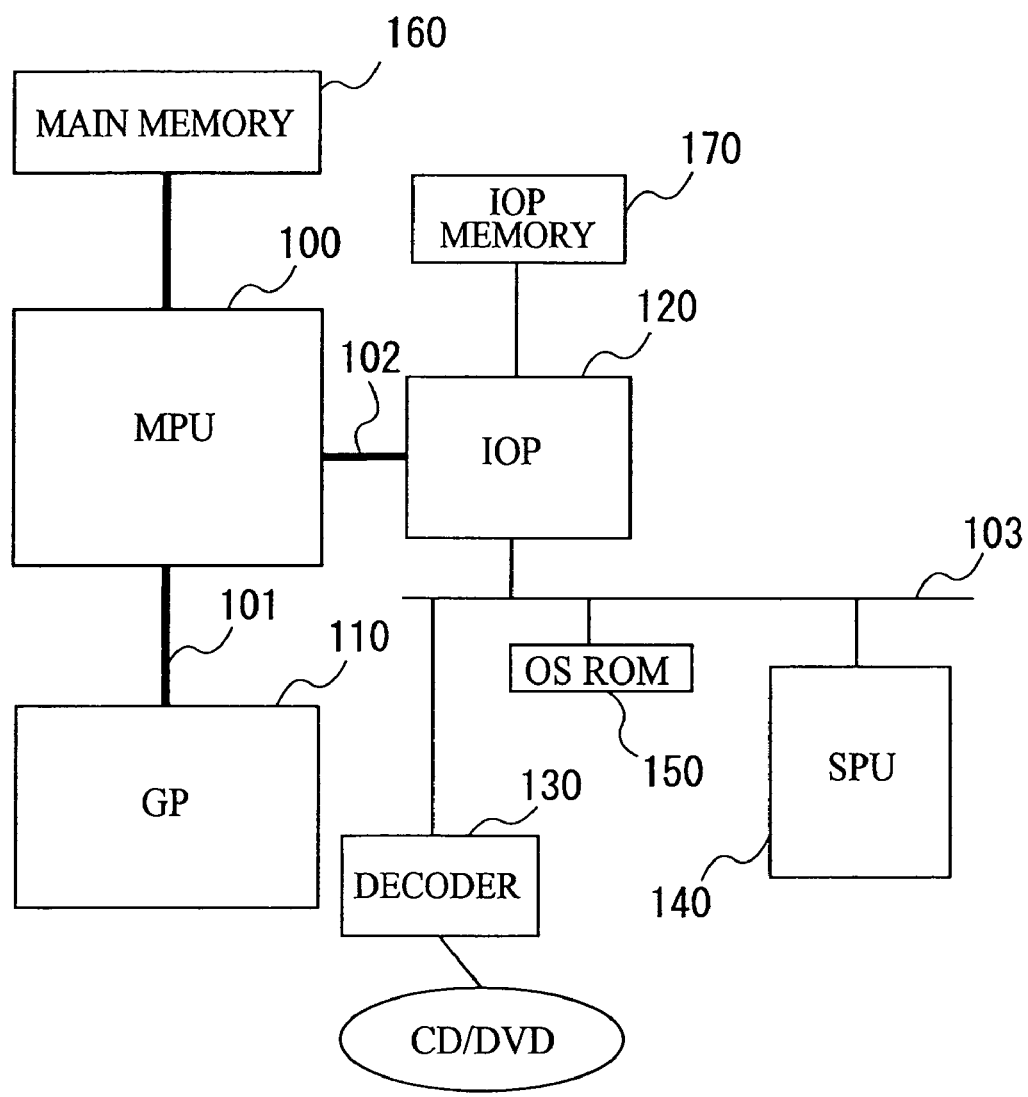
FIG. 11 is a functional block diagram of the entertainment apparatus according to the embodiment of the present invention.

FIG. 11 is a block diagram showing a configuration of the entertainment apparatus 10. As shown in this drawing, the entertainment apparatus 10 includes a main processing unit (MPU) 100, a graphics processor (GP) 110, the input/output sub-processor (IOP) 120, a CD/DVD decoder 130, a sound processing unit (SPU) 140, read-only memory (OSROM) 150, main memory 160, and IOP memory 170.

The MPU 100 and the GP 110 are connected via a dedicated bus 101. In addition, the MPU 100 and the IOP 120 are connected via a bus 102 called an S bus. Furthermore, the IOP 120, the CD/DVD decoder 130, the SPU 140, and the OSROM 150 are connected via a bus 103 called an SS bus.

The main memory 160 is connected to the MPU 100, and the IOP memory 170 is connected to the IOP 120. A controller (PAD) 30 or the relay unit 70 is connected to the IOP 120.

The MPU 100 is a main central processing unit (CPU) of the entertainment apparatus 10. The MPU 100 conducts predetermined processing by executing a program stored in the OSROM 150 or a program loaded into the main memory 160 from a CD or a DVD.

The GP 110 in this entertainment apparatus undertakes a rendering function. The GP 110 carries out rendering according to instructions from the MPU 100.

The IOP 120 controls data communication between the MPU 100 and peripheral units (the CD/DVD decoder 130, the SPU 140 and the like).

The CD/DVD decoder 130 reads out data from a CD or a DVD and transfers it to the main memory 160.

The SPU 140 reproduces compressed waveform data stored in a sound buffer (not shown in the drawing) using a predetermined sampling frequency in conformity with a sound production command from the MPU 100 or the like.

The OSROM 150 is ROM stored with a program to be executed by the MPU 100 or the IOP 120 at start-up. Codes shared by the MPU 100 and the IOP 120 and exclusive codes for the respective processors are separately stored in the OSROM 150. The exclusive codes (program) for the MPU 100 include a GPU emulator described later, for example.

The main memory 160 is main memory of the MPU 100 and is stored with commands executed by the MPU 100, data used by the MPU 100, and the like.

The IOP memory 170 is main memory of the IOP 120. The IOP memory 170 is stored with commands executed by the IOP 120, data used by the IOP 120, and the like.

In order to assure compatibility with entertainment apparatus of other models, the entertainment apparatus 10 has two operation modes: a first mode and a second mode. The first mode is a normal mode for carrying out normal operation of said apparatus, and the second mode is a compatible mode for different operation from normal operation, assumed compatibility with the other models. This entertainment apparatus normally starts up in the normal mode and operates in the normal mode. However, this entertainment apparatus enters the compatible mode for executing titles (software programs) for entertainment apparatus of the other models.

In the compatible mode, the IOP 120 operates as a main CPU of another model, and executes titles for an entertainment apparatus of that model by the MPU 100 and the GP 110 emulateing a graphics processor (GPU) of that model. In other words, a first processor means having the MPU 100 and the GP 110 and a second processor means having the IOP 120 exist in this entertainment apparatus. Furthermore, in the normal mode, the first processor means serves as the main CPU and the graphics processor, and the second means serves as the I/O processor. Meanwhile, in the compatible mode, the second processor means serves as the main CPU, and the first means serves as the graphics processor.

Therefore, the IOP 120 includes a processor core equivalent to main CPUs of the other models. In other words, the IOP 120 can execute program codes prepared for the main CPUs of the entertainment apparatus of the other models as is, and conduct the same operations. Note that the processor core of the IOP 120 only needs to execute the program codes prepared for the main CPUs of the entertainment apparatus of the other models as is and conduct the same operations (a binary compatible processor core, for example). With this embodiment, the same processor core is provided to improve backward compatibility with the entertainment apparatus of the other models.

Furthermore, while the operating frequency of the IOP 120 is, for example, 37.5 MHz in the normal mode, it is switched to 33 MHz in the compatible mode, which is the same as that of the entertainment apparatus of the other models. This allows consistent operation even when a game software side optimizes the operation of the hardware of the entertainment apparatus of the other models based on a single clock unit.

Furthermore, the MPU 100 and the IOP 120 switch interfaces therebetween according to the operation mode. In other words, in the compatible mode, the IOP 120 provides to the MPU 100 the same interface as those for main CPUs of the other models, and the MPU 100 provides to the IOP 120 the same interface as those for GPUs of the other models.

Moreover, the SPU 140 also switches operation between the compatible mode and the normal mode. In other words, in the compatible mode, it operates exactly the same as SPUs of the entertainment apparatus of the other models. On the other hand, in the normal mode, it operates as a higher performance sound processor than the SPU. Furthermore, the operating frequency of the SPU 140 is 44.1 KHz in the compatible mode in accordance with the sampling frequency of the CD-ROM, and is 48 KHz in the normal mode in accordance with the sampling frequency of the DVD.

Next, a general description of an operation mode determination method is provided.

Upon application of power, the CD/DVD decoder 130 starts up in the normal mode, and the entertainment apparatus 10 determines whether the disk loaded into the CD/DVD drive is for this entertainment apparatus or for an entertainment apparatus of another model. As a result of the determination, it starts up in the normal mode when a CD or DVD for this entertainment apparatus is loaded into the drive or when it is empty. On the other hand, it changes to the compatible mode when the disk in the drive is a CD for entertainment apparatus of the other models.

Figure 12:
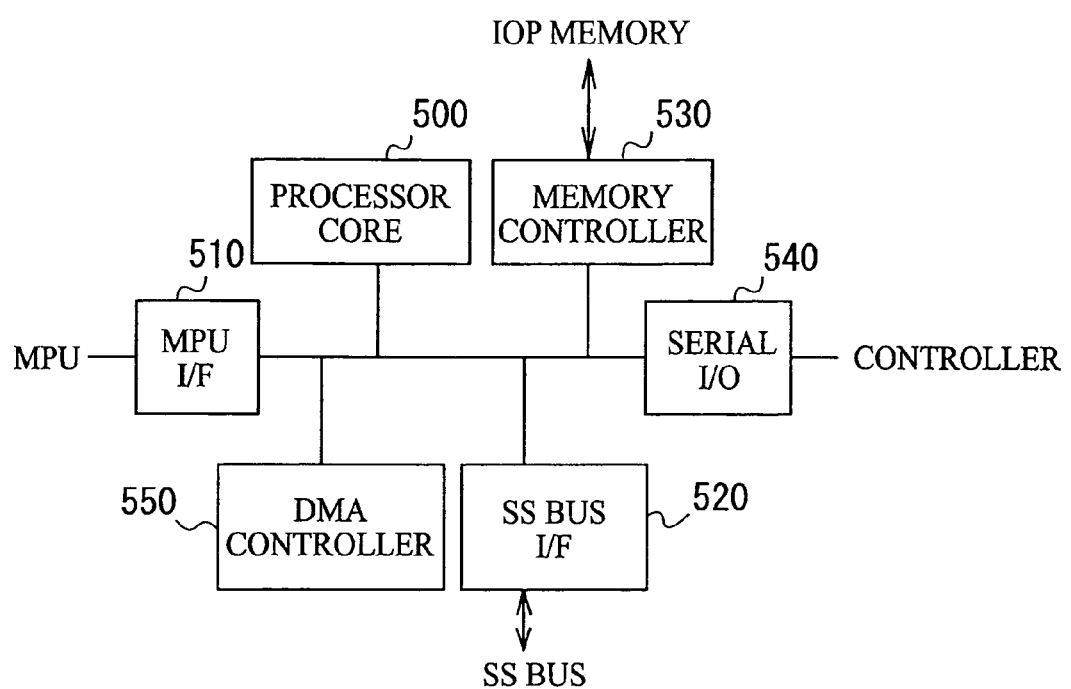
FIG. 12 is a functional block diagram of an input/output unit (IOP 120) of the entertainment apparatus according to the embodiment of the present invention.

Next, an inner structure of the IOP 120 is described. FIG. 12 is a diagram showing the inner structure of the IOP 120. As shown in this drawing, the IOP 120 includes a processor core 500, an MPU interface 510, an SS bus interface 520, a memory controller 530, a serial input/output unit 540, and a DMA controller 550.

The processor core 500 is a control unit controlling the operations of the IOP 120. As mentioned before, the processor core 500 is the same as the processor cores of main CPUs of entertainment apparatus of the other models.

The MPU interface 510 is an interface for carrying out data communication with the MPU 100.

The SS bus interface 520 is an interface for carrying out data communication with the SS bus 103.

The serial input/output unit 540 is an interface for carrying out data communication with the controller 30 or the relay unit 70 connected to the IOP 120.

The DMA controller 550 carries out data communication between the IPO memory 170 and each of the components of the IOP 120.

The memory controller 530 controls reading and writing of data in or out of the IOP memory 170.

A method of switching from the normal mode to the compatible mode is described next.

With the entertainment apparatus 10, switching from the normal mode to the compatible mode is conducted using a reset signal (power-on).

Once power is applied or a reset switch is pressed, the reset signal becomes effective, and when power sources of all units have started up and a predetermined duration has passed, the reset signal is set to be ineffective.

When the MPU 100, the IOP 120, the SPU 140 and the like are reset by the reset signal, they start operating in the normal mode.

When changing to the compatible mode in accordance to the aforementioned operation mode determination results after necessary initialization is completed, the MPU 100 generates a predetermined mode-changing signal, and the IOP 120, the SPU 140, and the like respectively start operating in the compatible mode in response to that signal.

Next, a boot sequence of the entertainment apparatus is described.

When reset according to the reset signal, the MPU 100 and the IOP 120 start executing a program from the same boot vector address. With this embodiment, since the MPU 100 and the IOP 120 are assumed as processors with the same architecture, the boot vector address is also the same.

In this case, the IOP 120 directly accesses the OSROM 150. Meanwhile, the MPU 100 accesses the OSROM 150 via the IOP 120. Since the IOP 120 initializes itself first, the MPU 100 is not given access to a bus and is kept in a waiting state until necessary initialization is completed.

In a region of the OSROM 150 accessed by the MPU 100 and the IOP 120 upon reset, codes for acquiring a processor ID, determining whether it is the MPU 100 or the IOP 120, and jumping to codes for each processor according to that result are stored. The IOP 120 and the MPU 100 respectively execute said codes for jumping to their own code.

When the IOP 120 jumps to its own code, it determines whether this reset is due to a reset signal or a mode switching signal. The IOP 120 can make such determination by accessing a specified bit of a control register.

In this case, the reset is due to the reset signal, and thus the hardware is initialized for this entertainment apparatus to start up. Drivers for the peripheral units (controller, CD/DVD drive, and the like) are then set up.

When the necessary initialization is completed, the IOP 120 starts operation of the MPU 100 that was in a waiting state (MPU turned on)), and enters itself into a waiting state for a request from the MPU 100. The MPU is turned on by the IOP 120 renewing the specified bit of the control register.

When it is authorized that the MPU 100 accesses to the OSROM 150 by the IOP 120 which has completed initialization of itself (MPU is on), the MPU 100 reads a program from the OSROM 150 and starts executing the read program. With this program, the MPU 100 acquires its own processor ID and jumps to its own code (namely for the MPU 100), as with the IOP 120.

The MPU 100 displays an opening screen once jumped to its own code.

Type determination of the disk loaded into the CD/DVD drive is then carried out. This determination is carried out by accessing a disk type register in the CD/DVD decoder 130.

Upon reset by the reset signal, the CD/DVD decoder 130 first identifies the disk inserted in the drive, the result thereof (disk for this entertainment apparatus/disk for the entertainment apparatus of another model/no disk, or the like) is reflected in the disk type register of the CD/DVD decoder 130 and enters a command waiting state.

When the disk for this entertainment apparatus is loaded, or no disk is loaded as a result of the disk type determination, this entertainment apparatus starts up as is.

Furthermore, when a disk for this entertainment apparatus is loaded into the drive, the MPU 100 loads into the main memory 160 software for this entertainment apparatus from the disk and then executes it. In the case of rendering during execution of the software, rendering is instructed to the GP 110, and in the case of outputting sound, sound output is instructed to the SPU 140 via the IOP 120.

Meanwhile, when a disk for an entertainment apparatus of another model is loaded into the drive as a result of the disk type determination, it is switched to the compatible mode and started up as that entertainment apparatus.

Therefore, the MPU 100 loads the GPU emulator into the main memory 160 from the OSROM 150 and then executes it.

A mode-switching signal is then generated to change the IOP 120 or the like to the compatible mode. When the mode-switching signal is generated, the MPU 100 enters a waiting state for a graphics command from the IOP 120. Hereafter, the MPU 100 and the GP 110 operate as a GPU of that model.

As with the case of being reset by the reset signal, when the IOP 120 reset by the mode-switching signal jumps to the code for the IOP 120, it determines whether this reset is due to the reset code or the mode-switching code.

In this case, the reset is due to the mode-switching signal, and thus the IOP 120 initializes the hardware for the entertainment apparatus of that model so that it can start up as that entertainment apparatus. Furthermore, as with the IOP 120, the SPU 140 reset by the mode-switching signal starts up in the compatible mode. When the mode-switching signal is asserted, an interrupt occurs to the CD/DVD decoder 130, and once the interrupt is detected, the CD/DVD decoder 130 then starts operating in the compatible mode, entering a command waiting state.

After necessary initialization is completed, the IOP 120 starts operating as a main CPU in the same manner as the main CPUs of the entertainment apparatus of the other models, booting the compatible kernel. Afterwards, the IOP 120 executes software for the entertainment apparatus of the other models, as with the main CPUs of the entertainment apparatus of the other models. In the case of rendering graphics during execution of the software, IOP 120 instructs the MPU 100 to render by transmitting a GPU command thereto, and in the case of outputting sound, instructs the SPU 140 to output sound in the compatible mode.

(2) Description of Relay Unit 70

Next, the inner structure of the relay unit 70 is described in detail.

Figure 13:
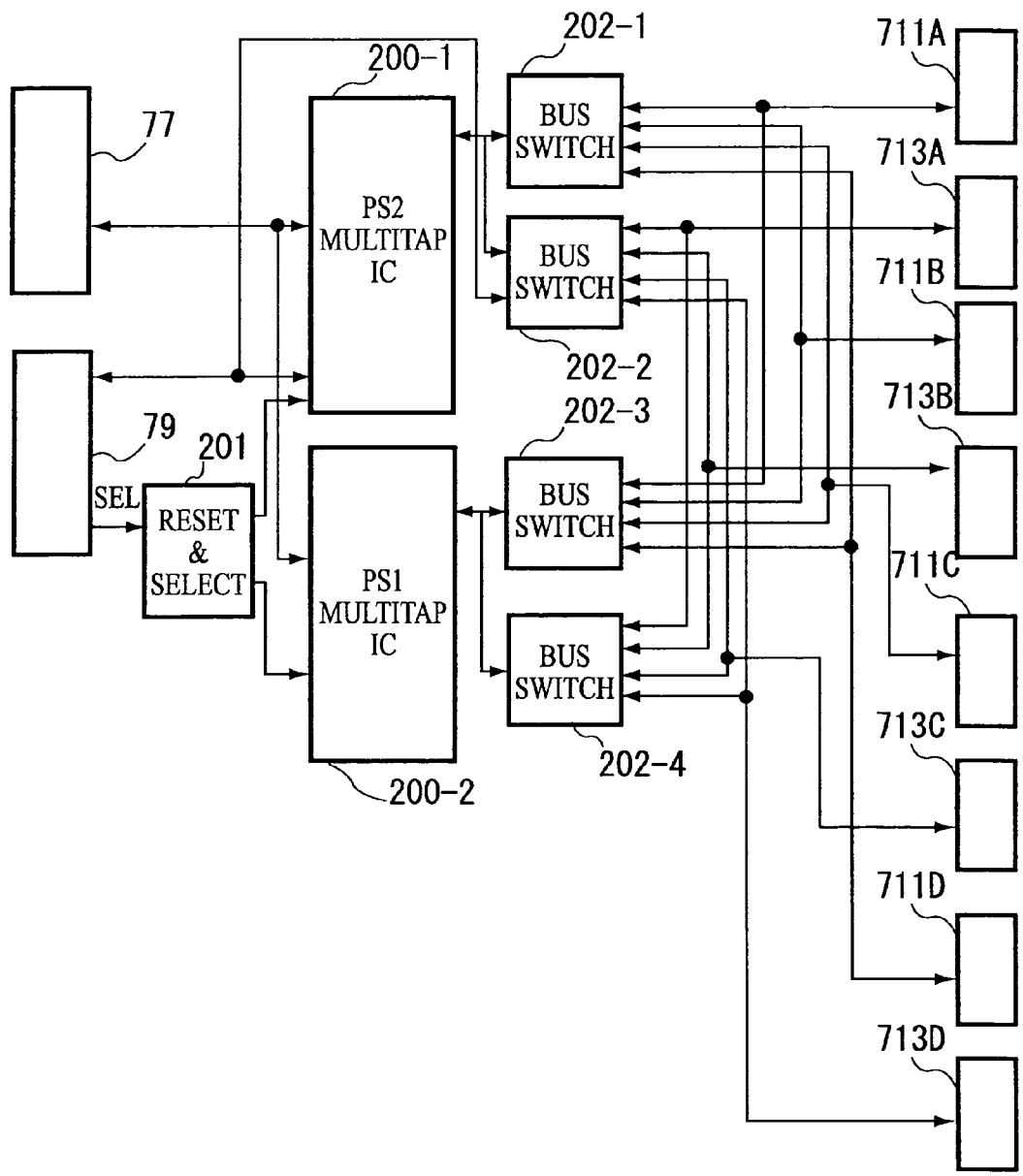
FIG. 13 is a functional block diagram of the relay unit according to the embodiment of the present invention.

FIG. 13 is a block diagram showing the inner structure of the relay unit 70. 200-1 denotes a first mode (PS2) multitap IC while 200-2 denotes a second mode (PSI) multitap IC. The multitap IC 200-1 carries out relay processing of data among the entertainment apparatus 10, multiple controllers, and memory cards in the first mode, and the multitap IC 200-2 carries out relay processing of data among the entertainment apparatus 10, multiple controllers, and memory cards in the second mode. Signals are transferred between the controller connector 77 and the multitaps IC 200-1 and 200-2. Furthermore, a signal is transferred between the memory card connector 79 and the multitap IC 200-1.

201 denotes a control signal generator configured to generate a control signal (reset and select) for selecting either the multitap IC 200-1 or 200-2. In conformity with this control signal, the multitap IC 200-1 operates and the multitap IC 200-2 enters a non-operational state in the first mode. The opposite occurs in the second mode.

202-1 through 202-4 are bus switches for relaying between the multitaps IC 200-1 and 200-2 and controller connectors 711A through 711D and between the multitaps IC 200-1 and 200-2 and memory card connectors 713A through 713D. The controller connectors 711A through 711D are connected to the bus switches 202-1 and 202-3. The bus switch 202-1 is connected to the multitap IC 200-1 while the bus switch 202-3 is connected to the multitap IC 200-2. Accordingly, signals may be transferred between the controllers 30 and either the multitap IC 200-1 or 200-2. The memory card connectors 713A through 713D are connected to the bus switches 202-2 and 202-4. The bus switch 202-4 is connected to the multitap IC 200-2 while the bus switch 202-2 is connected to the multitap IC 200-1 and the memory card connector 79. Accordingly, signals may be transferred between the memory card 50 and either the multitap IC 200-2, 200-1, or the memory card connector 79.

Since the relay unit 70 is configured as such, signals of the controllers 30 and the memory cards 50 may be processed by either the multitap IC 200-1 or 200-2 in conformity with the control signal from the control signal generator 201.

Figure 14:
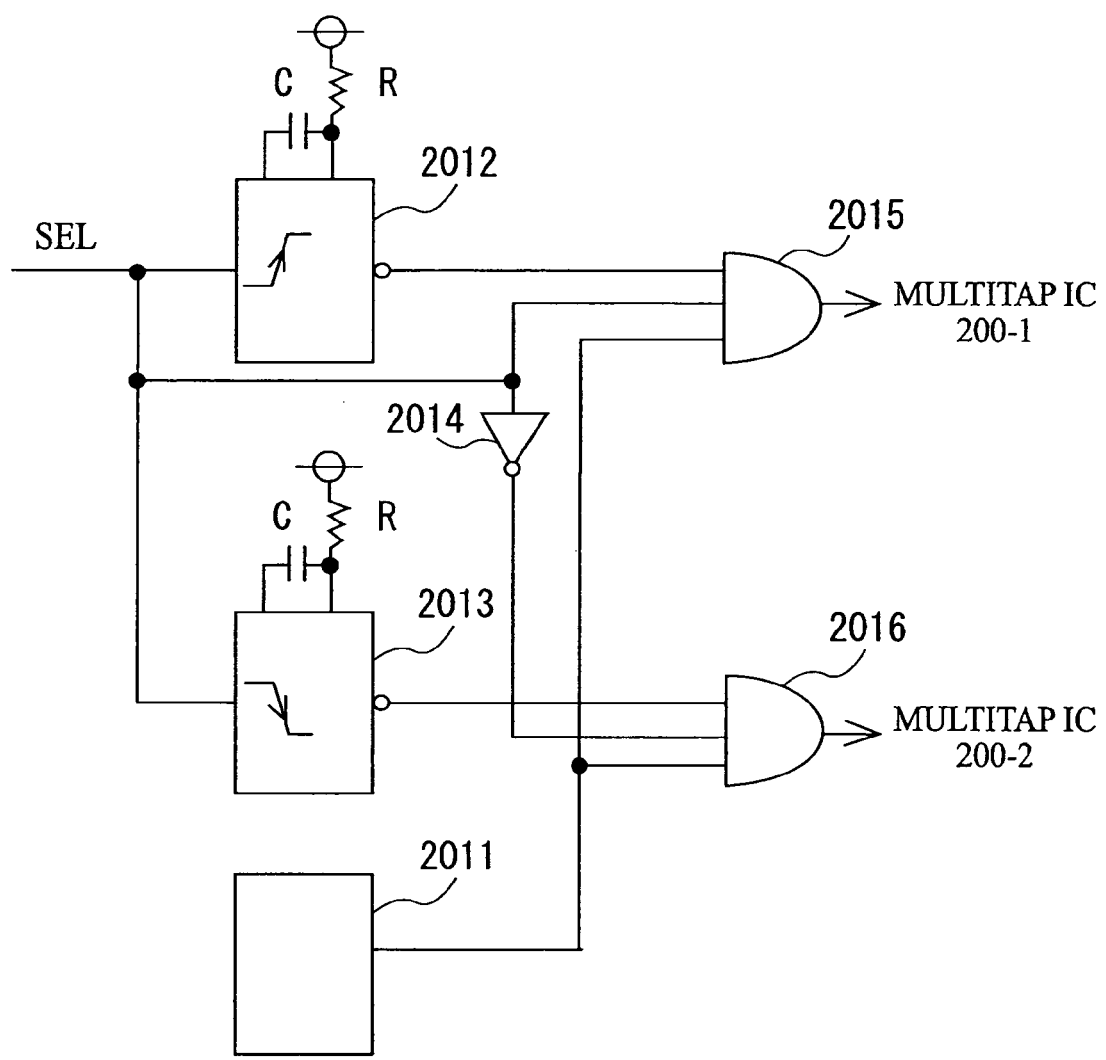
FIG. 14 shows an exemplary circuitry of a control signal generator according to the embodiment of the present invention.

A specific exemplary circuit of the control signal generator 201 is shown in FIG. 14. With the example of this drawing, it is in the first mode (PS2) when a selection signal SEL externally entered is at a low level and thereby the multitap IC 200-1 is selected. It is in the second mode (PS1) when a selection signal SEL externally entered is at a high level and thereby the multitap IC 200-2 is selected.

In FIG. 14, 2011 denotes a reset IC configured to generate a reset signal MTAP-RST. 2012 denotes a pulse generator configured to generate pulses of a predetermined width (300 ms) when the selection signal SEL is at a high level. 2013 denotes a pulse generator configured to generate pulses of a predetermined width (300 ms) when the selection signal is at a low level. These durations may be adjusted by the values of each condenser C and corresponding resistor R connected to each other. 2014 denotes an inverter. 2015 denotes a 3-input AND gate, which receives a selection signal SEL and output from the pulse generator 2012 and the reset IC2011. 2016 denotes a 3-input AND gate, which receives a inversion signal of a selection signal SEL and output from the pulse generator 2013 and the reset IC2011.

The output of the AND gate 2015 is a selection signal for the multitap IC 200-1, and a high level signal is output when the selection signal SEL is at a low level. The output of the AND gate 2016 is a selection signal for the multitap IC 200-2, and a high level signal is output when the selection signal SEL is at a high level. However, when the reset signal is effective right after application of power or resetting, and until a predetermined duration (300 ms) has passed since the selection signal SEL has changed from the high level to the low level or from the low level to the high level, the output of the AND gate 2015 is at a low level. Accordingly, neither the multitap IC 200-1 nor 200-2 is selected during resetting, and a predetermined duration from when the operation mode of the entertainment apparatus 10 is switched is the same as above. More specifically, preventing both the multitap ICs 200-1 and 200-2 from operating for the predetermined duration right after switching operation mode as with the latter allows prevention of confliction of those output signals, thereby preventing the entertainment apparatus 10 from determining it as occurrence of an error.

The present invention is not limited to the above-given embodiment, and various modifications within the scope of the invention according to the appended claims are possible, which are naturally included within the scope of the present invention.

INDUSTRIAL APPLICABILITY

According to the present invention, since the operation mode of the relay unit is automatically selected in accordance with switching of the operation mode of the entertainment apparatus main body, complicated tasks such as replacing relay units when switching operation mode are unnecessary.

Furthermore, not carrying out both the operations in the first mode and the second mode right after switching operation mode allows avoidance of confliction of those output signals, thereby preventing occurrence of the resulting trouble.

The invention claimed is:

1. A relay unit incorporated in a gaming system and connecting one or a plurality of manipulation terminals or external storage units to a single port of an entertainment apparatus having at least a first mode and a second mode as operation modes; wherein
   the entertainment apparatus reads information from a recording medium, determines an operation mode based on the read information, operates in the determined operation mode, generates an operation mode selection signal in accordance with the determined operation mode, and outputs the generated operation mode selection signal to the relay unit;
   the relay unit is located outside the entertainment apparatus and includes:
      a main body connector for detachably connecting the relay unit to the entertainment apparatus;
      at least one or a plurality of controller connectors for detachably connecting the one or the plurality of manipulation terminals;
      a first relay processing unit;
      a second relay processing unit; and
      a control signal generator;
   the first relay processing unit carries out relay processing for the first mode between the entertainment apparatus and the one or the plurality of manipulation terminals or the external storage units;
   the second relay processing unit carries out relay processing for the second mode between the entertainment apparatus and the one or the plurality of manipulation terminals or the external storage units;
   the relay unit receives the selection signal from the entertainment apparatus via the main body connector;
   the control signal generator operates the first relay unit to carry out the relay processing for the first mode when the relay unit receives the selection signal in accordance with the first mode;
   the control signal generator operates the second relay unit to carry out the relay processing for the second mode when the relay unit receives the selection signal in accordance with the second mode;
   the first and second modes are different gaming protocols;
   wherein the first relay processing unit is a first multitap IC and the second relay processing unit is a second multitap IC; and
   wherein the first multitap IC and the second multitap IC each have at least one bus switch electrically coupled thereto for communicating signals between the one or plurality of controllers and the first multitap IC and/or the second multitap IC.

2. The relay unit according to claim 1, wherein in at least either the case of changing from the first mode to the second mode or changing from the second mode to the first mode, a period in which neither relay processing for the first mode nor relay processing for the second mode is carried out for mode switching is provided.

3. The relay unit according to claim 2, wherein the duration of the period in which neither relay processing for the first mode nor relay processing for the second mode is carried out is defined according to a communication procedure with the entertainment apparatus.

4. The relay unit according to claim 1, wherein
   the control signal generator is configured to generate a first control signal to operate the first relay processing unit and a second control signal to operate the second relay processing unit in conformity with the selection signal.

5. The relay unit according to claim 4, wherein the control signal generator comprises a pulse generator configured to generate pulses of a predetermined width when changing from the first mode to the second mode, or from the second mode to the first mode.

6. The relay unit according to claim 1, wherein
   the second mode is a compatible mode for insuring compatibility with other entertainment apparatuses of other models.

7. A communication system in a gaming system, comprising an entertainment apparatus having at least a first mode and a second mode as operation modes, and a relay unit connecting one or a plurality of manipulation terminals or external storage units to a single port of the entertainment apparatus; wherein
   the entertainment apparatus reads information from a recording medium, determines an operation mode based on the read information, operates in the determined operation mode, generates an operation mode selection signal in accordance with the determined operation mode, and outputs the generated operation mode selection signal to the relay unit;
   the relay unit is located outside the entertainment apparatus and includes:
      a main body connector for detachably connecting the relay unit to the entertainment apparatus;
      at least one or a plurality of controller connectors for detachably connecting the one or the plurality of manipulation terminals;
      a first relay processing unit;
      a second relay processing unit; and
      a control signal generator;
   the first relay processing unit carries out relay processing for the first mode between the entertainment apparatus and the one or the plurality of manipulation terminals or the external storage units;
   the second relay processing unit carries out relay processing for the second mode between the entertainment apparatus and the one or the plurality of manipulation terminals or the external storage units;

the relay unit receives the selection signal from the entertainment apparatus via the main body connector;

the control signal generator operates the first relay unit to carry out the relay processing for the first mode when the relay unit receives the received selection signal in accordance with the second node;

the first and second modes are different gaming protocols;

wherein the first relay processing unit is a first multitap IC and second relay processing unit is a second multitap IC; and wherein the first multitap IC and the second multitap IC each have at least one bus switch electrically coupled thereto for communicating signals between the one or plurality of controllers and the first multitap IC and/or the second multitap IC.

8. A communication method for connecting one or a plurality of manipulation terminals or external storage units to a single port of an entertainment apparatus in a gaming system having at least a first mode and a second mode as operation modes via a relay unit, wherein the relay unit is located outside the entertainment apparatus and includes a main body connector for detachably connecting the relay unit to the entertainment apparatus, at least one or a plurality of controller connectors for detachably connecting the one or the plurality of manipulation terminals, first and second relay processing units, and a control signal generator, said communication method comprising:

a step of reading information from a recording medium;

a step of determining an operation mode of the entertainment apparatus based on the read information;

a step of generating a selection signal in accordance with that determination result;

a step of transmitting the selection signal to the relay unit, which are carried by the entertainment apparatus;

a step of receiving the selection signal from the entertainment apparatus by the relay unit;

a step of relaying for the first mode when the received selection signal corresponds to a signal for the first mode by the first relay processing unit; and a step of relaying for the second mode when the received selection signal corresponds to a signal for the second mode by the second relay processing unit, a step of operating the first relay unit to carry out the relaying when the relay unit receives the selection signal in accordance with the first mode;

a step of operating the second relay unit to carry out the relay processing for the second mode when the relay unit receives the selection signal in accordance with the second mode;

wherein the first and second modes are different gaming protocols;

wherein the first and second relay processing units are first and second multitap ICs; and wherein the first and second multitap ICs each have at least one bus switch electrically coupled thereto for communicating signals between the one or plurality of controllers and first and/or second multitap ICs.

9. The communication method according to claim 8, wherein the step of determining includes setting operation mode to the first mode when the recording medium is removed, and generating a selection signal corresponding to the first mode.

10. The communication method according to claim 8, further comprising a step of resetting both the first relay processing unit and the second relay processing unit for a predetermined period, which is carried out by the relay unit, when the selection signal switches from a signal corresponding to the first mode to a signal corresponding to the second mode, or vice versa.

11. The communication method according to claim 8, wherein the step of determining includes setting operation mode to the first mode when power of the entertainment apparatus is applied, and generating a selection signal corresponding to the first mode, said communication method further comprises a step of resetting both the first relay processing unit and the second relay processing unit for a predetermined period, which is carried out by the relay unit, when power of the entertainment apparatus is applied and a new selection signal corresponding to the first mode is generated.

12. The relay unit according to claim 1 wherein signals between the one or plurality of controllers and a memory card may be processed by either the first or second multitap IC in accordance with a control signal from the control signal generator.

13. The communication system according to claim 7 wherein signals between the one or plurality of controllers and a memory card may be processed by either the first or second multitap IC in accordance with a control signal from the control signal generator.

14. The communication method according to claim 8 wherein signals between the one or plurality of controllers and a memory card may be processed by either the first or second multitap IC in accordance with a control signal from the control signal generator.

* * * * *